United States Patent
Jones et al.

(10) Patent No.: US 6,600,757 B1
(45) Date of Patent: Jul. 29, 2003

(54) PAGING CHANNEL CONTROL METHOD AND APPARATUS

(75) Inventors: Edward Arthur Jones, Maldon (GB); Gerhard Petri, Billericay (GB)

(73) Assignee: International Mobile Satellite Organization (GB)

( * ) Notice: Subject to any disclaimer, the term of this patent is extended or adjusted under 35 U.S.C. 154(b) by 0 days.

(21) Appl. No.: 08/984,325

(22) Filed: Dec. 3, 1997

(30) Foreign Application Priority Data

Dec. 3, 1996 (GB) .............................. 9625256

(51) Int. Cl.$^7$ ................................ H04Q 7/00
(52) U.S. Cl. .................. 370/480; 370/436; 370/468; 455/450
(58) Field of Search .................. 370/328, 329, 370/330, 331, 336, 337, 345, 347, 350, 436, 437, 468; 455/422, 426, 427, 434, 436, 450, 437, 438

(56) References Cited

U.S. PATENT DOCUMENTS

| | | | |
|---|---|---|---|
| 4,686,672 A | | 8/1987 | Namiki |
| 4,849,750 A | | 7/1989 | Andros et al. ......... 340/825.44 |
| 5,206,855 A | | 4/1993 | Schwendeman et al. ...... 370/50 |
| 5,258,980 A | * | 11/1993 | Maebara et al. ............ 370/347 |
| 5,309,439 A | * | 5/1994 | Roos .......................... 370/508 |
| 5,519,404 A | | 5/1996 | Cances et al. |
| 5,627,830 A | * | 5/1997 | Kotzin ....................... 370/336 |
| 5,640,679 A | * | 6/1997 | Lundqvist et al. .......... 455/525 |
| 5,740,165 A | * | 4/1998 | Vannucci .................... 370/330 |
| 5,774,790 A | * | 6/1998 | Dupuy ....................... 455/33.1 |
| 5,781,540 A | * | 7/1998 | Malcolm et al. ............ 370/321 |
| 5,812,545 A | * | 9/1998 | Liebowitz et al. .......... 370/337 |
| 5,930,706 A | * | 7/1999 | Raith ......................... 455/422 |

FOREIGN PATENT DOCUMENTS

| | | |
|---|---|---|
| EP | 0 444 485 A2 | 2/1991 |
| EP | 0 637 895 A2 | 7/1994 |
| GB | 2284496 A | 6/1995 |
| GB | 2299695 A | 10/1996 |

* cited by examiner

Primary Examiner—Douglas Olms
Assistant Examiner—Bob A. Phunkulh
(74) Attorney, Agent, or Firm—Banner & Witcoff, Ltd.

(57) ABSTRACT

In a messaging system, message traffic is transmitted on one or more traffic channels $T_1$, $T_2$ and the allocation of groups $S_1$, $S_2$ of receivers to the traffic channels $T_1$, $T_2$ is controlled by information transmitted on a bulletin board channel BB. A predetermined number of frames before a change in the traffic channel allocation, a countdown value is transmitted in the relevant traffic channel $T_1$ and the countdown value is decremented in each subsequent frame. Before the countdown value reaches zero, the groups of receivers $S_1$, $S_2$ retune to the bulletin board channel, receive their new channel allocations and retune to the traffic channel indicated for their group. The frame timings of the different traffic channels $T_1$, $T_2$ are staggered to reduce the peak power required to transmit message bursts in these channels.

30 Claims, 8 Drawing Sheets

PAGING CHANNEL CONTROL METHOD AND APPARATUS

The present invention relates to a channel control method and apparatus, and particularly, though not exclusively, to a method and apparatus for implementing a radio frequency messaging or paging system.

Paging systems generally include at least one transmitter which receives messages addressed to different paging receivers and transmits each message with data identifying the receiver for which the message is intended. Each paging receiver monitors the transmission channel or channels and, when a message addressed to the paging receiver is identified, the receiver stores and displays the message for the user. The message may be a simple alert, or a numeric or alphanumeric string.

In most terrestrial local paging systems, the receiver or pager is tuned to a single frequency channel which is fixed during manufacture, and messages addressed to the receiver are transmitted on this channel. The capacity of such systems is limited by the bandwidth of the single frequency channel.

The capacity may be increased by using more than one transmit frequency and allocating one of these frequencies to each receiver.

The European Radio Messaging System (ERMES), defined by the European Telecommunication Standard 300 133, allows each paging receiver to monitor 16 different frequency channels in turn according to a predetermined schedule, to detect messages addressed to the receiver on any one of these channels. The ERMES system allows the user to roam between different networks and countries in which different frequency channels may need to be used for transmission of paging messages.

However, neither of the above methods is suitable for messaging or paging systems in which bandwidth usage and transmit power must be kept to a minimum such as, for example, a satellite-based messaging system. Moreover, these methods are inflexible as they do not easily allow reallocation of frequency channels, such as adding a new frequency channel to allow an increase in traffic, discontinuing use of a frequency channel when traffic is reduced, or changing frequency channel allocations according to operational constraints.

In many types of radio frequency communication system, channel assignment information is transmitted on a common channel, to which receivers are normally tuned. When a receiver receives a command on the common channel, it retunes to another channel to receive or transmit a message. While this method is suitable for a communication system in which a different traffic channel may need to be used by a receiver for each message, it is not well suited to paging or messaging systems in which the re-allocation of frequencies to receivers is only required occasionally.

The document U.S. Pat. No. 4,849,750 discloses a paging receiver which is responsive to received commands to retune to different message channels.

The document GB 2,284,496A discloses a paging system in which base stations receive and retransmit paging messages. A first set of the base stations retransmits promptly following receipt, while a second set delays retransmission so as not to retransmit simultaneously with the first set.

The document U.S. Pat. No. 5,206,855 discloses a multiple frequency messaging system in which the same paging channel is offset by one slot from one frequency to the next, so that a receiver can receive a message by sequentially scanning the frequencies.

SUMMARY OF THE INVENTION

According to one aspect of the present invention, there is provided a paging system in which paging messages are transmitted on a first traffic channel and system control information is transmitted on a control channel. In order to alert paging receivers to new system control information, change indication information is transmitted on the first traffic channel. In response to the change indication information, at least some of the paging receivers tuned to the first traffic channel retune to the control channel and, in response to the new system control information, retune to a second traffic channel. In this way, receivers may be tuned for the majority of the time to traffic channels on which messages can be received, and may be reassigned to different traffic channels. The receivers only need retune to the control channel when traffic channels are reassigned.

Preferably, the change indication information is transmitted more than once before the receivers are required to retune to the control channel, so as to reduce the possibility that some of the receivers may not receive the change indication information because of interference. Preferably, each repetition of the change information indicates the period remaining until the receivers should retune to the control channel, so that the retuning of the receivers may be synchronised even if the receivers do not receive all of the change indication signals.

According to another aspect of the present invention, there is provided a communication system in which first and second traffic channels are transmitted to a plurality of receivers, the first and second traffic channels including messages addressed to selected ones of the receivers. Signals in the first and second traffic channels are transmitted in a periodic frame structure with any messages being transmitted sequentially within the frame. The beginning of the second traffic frame is delayed by a period less than the frame period with respect to the beginning of the first traffic frame. In this way, the peak transmission power can be reduced.

Where the traffic frames are transmitted via satellite, the above aspect is particularly advantageous, since the peak power output of a satellite is limited by the satellite power sources.

In another aspect, a control channel is transmitted together with first and second traffic channels each having a periodic frame structure with the second traffic channel frames delayed relative to the first.

The control channel includes first and second traffic channel data indicating properties of the first and second traffic channel respectively, transmitted sequentially. The order of transmission of the first and second traffic channel data is the same as the order of the beginning of the first and second traffic frames. Thus, the interval between receiving traffic channel data on the control channel and tuning to the corresponding traffic frame is substantially the same for all traffic channels and may be set as short as possible while still ensuring that all receivers are able to retune to their respective traffic channels before the beginning of the next traffic frame.

The present invention extends to components of the above systems and methods performed thereby.

BRIEF DESCRIPTION OF THE DRAWINGS

Specific embodiments of the present invention will now be described with reference to the accompanying drawings, in which.

SPECIFIC DESCRIPTION OF AN EMBODIMENT

Figure 1:
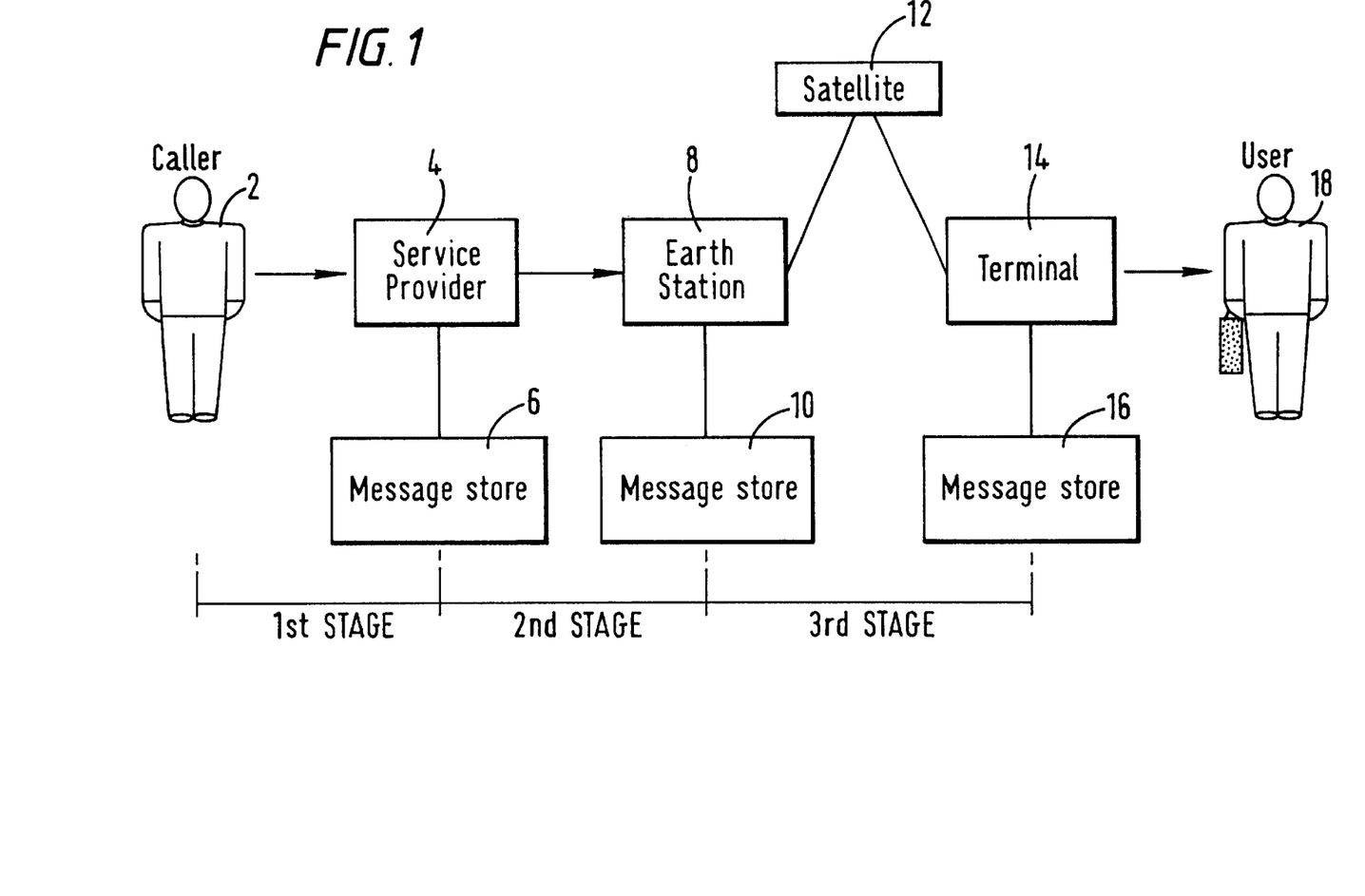
FIG. 1 is a schematic diagram of a satellite messaging system in an embodiment of the present invention.

FIG. 1 shows the structure of a satellite based store and forward messaging system, in which messages are sent from a caller 2 to a selected user 18. The messages are initially sent to a service provider 4, which routes the message to the appropriate earth station 8. The service area of the messaging system is covered by a plurality of satellites 12, such as the Inmarsat-3™ satellites which are geostationary repeater satellites which relay data from earth stations to a selected area of the earth's surface covered by one of the spot beams generated by the satellite antennas. Each satellite 12 is able to receive and relay signals from more than one earth station located within its field of view. Messages are transmitted from the earth station 8 to the satellite 12, which relays the messages down to a selected area. If a message terminal 14 is within that area, it receives the messages and decodes those message which carry its identity code. The decoded messages are displayed to the user 18.

The messages are sent by means of a three-stage process, as explained below.

Caller to Service Provider

The caller 2 sends a message to the service provider 4, for example by telephoning an operator and dictating the message, or by encoding the message and sending it over a network, for example by means of a modem connected to a PSTN. The message may comprise an alphanumeric or numeric string, a simple alert code, or binary data, which is passed transparently from the caller 2 to the user 18. Additionally, the caller specifies the identity of the user 18 and optionally the user's approximate location.

The service provider 4 consists of a facility which allows reception of messages from callers, storage of the messages in a service provider store 6 and routing of the messages; the service provider 4 is analogous in this way to service providers which are conventionally provided in terrestrial paging systems.

Service Provider to Earth Station

The service provider 4 formats the message and the user identity to generate a paging request message. The service provider 4 routes the paging request message to the earth station 8 which serves the satellite 12 which covers the region in which the user 18 is expected to be. This region may be indicated by the caller 2 or may be determined from a location register stored at the service provider, which is updated by the user 18 calling the service provider 4. The paging request message may be routed to more than one earth station serving more than one satellite if there is uncertainty as to the location of the user 18.

Earth Station to Message Terminal

The earth station 8 receives the paging request message and stores it in an earth station store 10, which buffers messages prior to transmission over the satellite 12. The paging request message is converted to a format for transmission and transmitted to the satellite 12, which retransmits the message over one of the spot beams selected by the earth station 8.

If the message terminal 14 is switched on, is tuned to the correct traffic channel and is within the coverage area of the selected spot beam, it detects that an address portion of the message matches an identity code assigned to the message terminal and decodes the message following this address portion. The decoded message is stored in a message terminal store 16 and is displayed to the user 18.

Channel Types

In addition to traffic channels on which the messages are sent, the satellite 12 also broadcasts a bulletin board channel on a fixed frequency, on a global beam which has a coverage area substantially encompassing the coverage areas of all the spot beams of the satellite. When the terminal 14 is switched on, it initially tunes to the bulletin board channel, which carries all the information needed by the terminal to retune to the frequency of the traffic channel on which it can expect messages to be transmitted.

Figure 2:
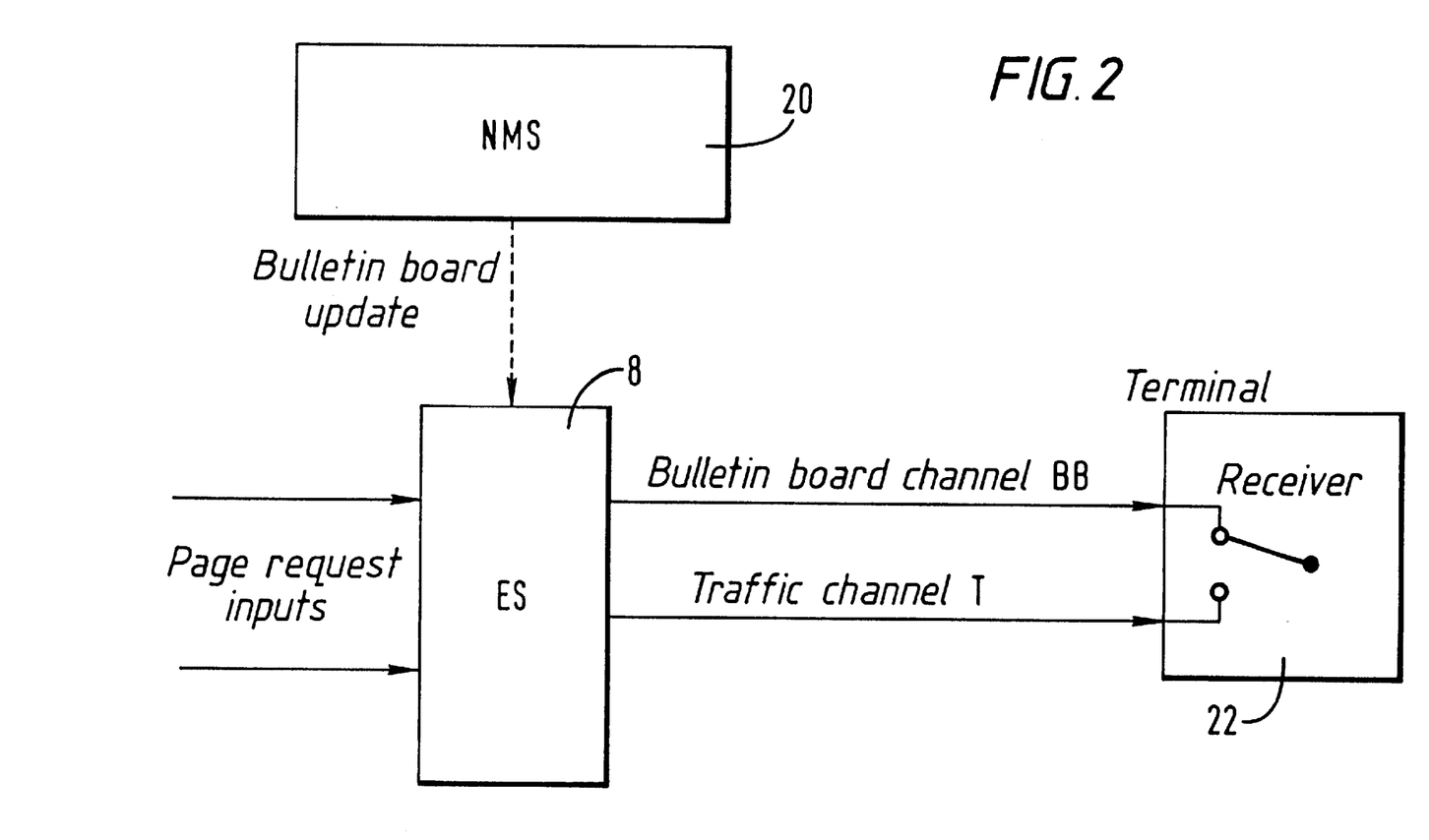
FIG. 2 is a schematic diagram showing bulletin board and traffic channels transmitted from the earth station to the message terminal of FIG. 1.

As shown schematically in FIG. 2, network information concerning the traffic channel frequency allocations is submitted from a network management system 20, which determines which frequencies are assigned to each earth station 8. The information is used to generate the bulletin board channel information, which is transmitted in the bulletin board channel BB from the earth station 8 via the satellite 12 to the terminal 14. A receiver 22 in the terminal 14 is selectively tunable to either the bulletin board channel frequency or any designated one of a set of traffic channel frequencies.

Earth Station

Figure 3:
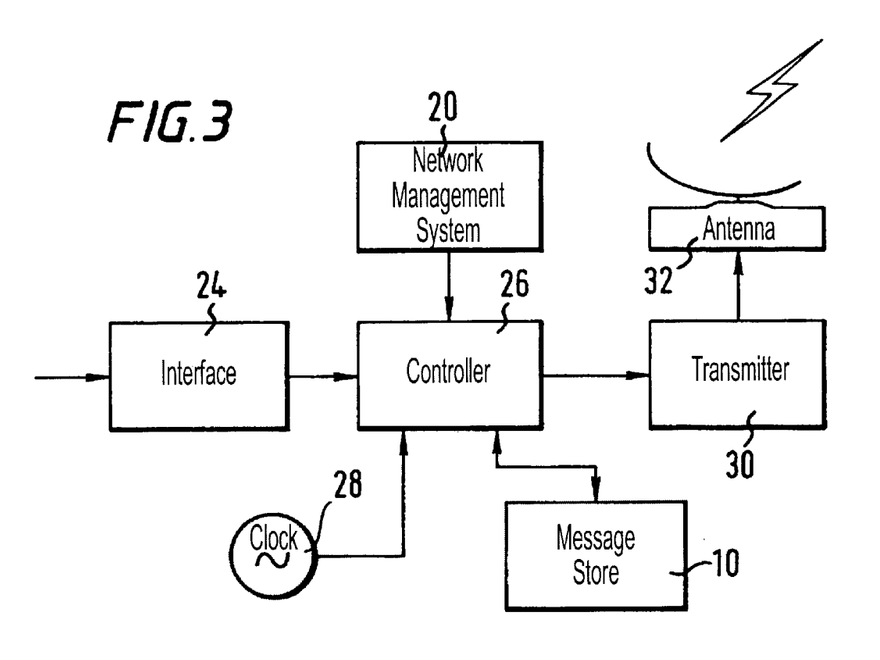
FIG. 3 shows the functions of the earth station in greater detail.

FIG. 3 shows the functional portions of the earth station 8. An interface 24 is adapted to receive paging request signals from the service provider transmitted over a network, such as an ISDN and to convert them to data for use within the earth station 8. The data is input to a controller 26 which stores the data in the message store 10 until the data is scheduled for transmission. The controller 26 then reads the data from the message store 10 and outputs it to a transmitter 30 in a channel format as described below, with a timing determined by means of a clock 28. The controller 26 controls the frequency of transmission of the transmitter 30 in accordance with the information received from the network management system 20 in order to transmit the paging messages on the allocated traffic channels via an antenna 32. The controller 26 also generates the bulletin board channel information in a bulletin board channel format as described below, and controls the transmitter 30 to transmit the bulletin board channel information at the bulletin board channel frequency.

Satellite

The satellite 12 receives signals transmitted by the earth station 8 and translates each received frequency channel to a corresponding transmitted frequency channel without affecting the signal content; the satellite acts as a transparent repeater. Different groups of received frequency channels are mapped onto different transmitted spot beams and one or more of the received frequency channels are mapped onto the global beam.

Message Terminal

Figure 4:
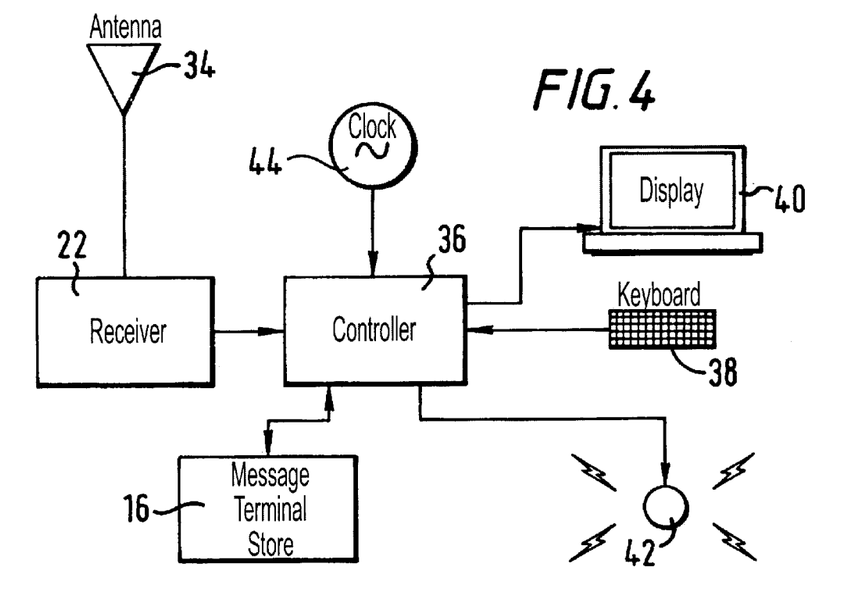
FIG. 4 shows the functions of the message terminal in greater detail.

FIG. 4 shows the functional portions of the message terminal 14, which comprises an antenna 34 connected to the receiver 22. A controller 36 receives message data from the receiver 22. The controller 36 has a clock 44 which enables tuning of the receiver 22 to a predetermined frequency at a predetermined time, as described in more detail below. Messages addressed to the message terminal 14 are stored in the message terminal store 16 and retrieved therefrom under the control of the controller 36. The controller 36 is connected to a keypad 38 to allow the user to select a message which is displayed on a display 40, which may be a liquid crystal display (LCD). The controller 36 is also connected to an alerting device 42 to alert the user 18 when a new message has been received, by generating an audible tone, flashing an LED or by other suitable means. The user 18 may then operate a key on the key pad 38 to actuate display of the new message. Previously received messages may also be displayed.

The terminal 14 may be a simple message receiver or may be integrated with other functions, such as in a duplex voice and/or data terminal.

Traffic Channel Structure

Each traffic channel is transmitted at a corresponding traffic channel frequency. The traffic channel transmissions are arranged in repeating frames of data symbols, each data symbol comprising five bits. Each frame may have a length FL of 960 symbols, corresponding to 4 minutes' duration, for example.

Figure 5:
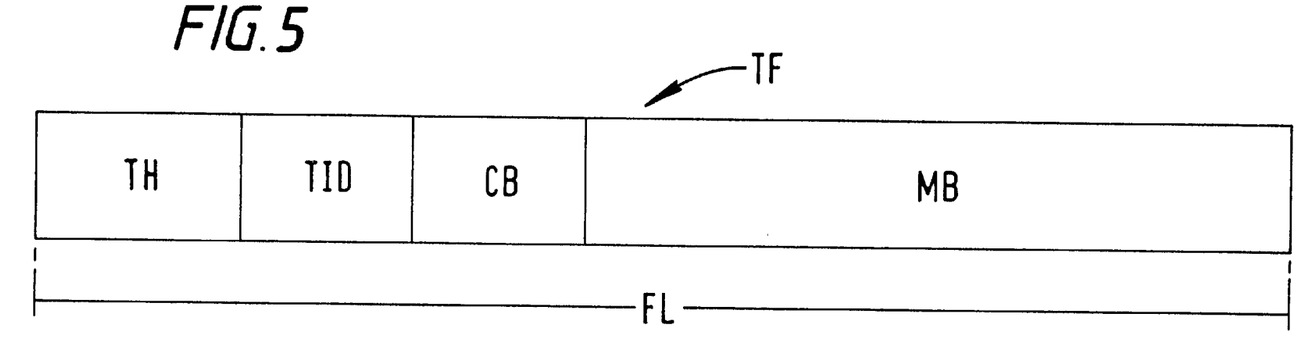
FIG. 5 shows the structure of a frame of one of the traffic channels.

The structure of each frame is shown in FIG. 5. The frame TF begins with a frame header TH of fixed length which contains synchronisation information to assist the terminals 14 to acquire the timing and frequency of the traffic channel. There follows a frame identity block TID which contains general system information, such as the identity code of the transmitting earth station 8 and the serial number of the frame, and includes a changeover countdown field, which is used to indicate an imminent change in frequency allocation and will be described in detail below.

Next, the frame F contains a control block CB containing control information, followed by a message block MB containing one or more messages addressed to individual terminals 14. Each message is of variable length and includes an identity code indicating the terminal 14 to which the message is addressed, a message type code indicating the message type and the message itself. If insufficient messages are available to fill the message block field MB, transmission in the traffic channel ceases at the end of the messages until the beginning of the next frame TF.

Bulletin Board Channel Structure

The bulletin board channel is transmitted continuously at a fixed frequency. Transmissions in the bulletin board channel may be arranged in a frame structure with a length FL of 960 5-bit symbols, lasting four minutes for example.

Figure 6:
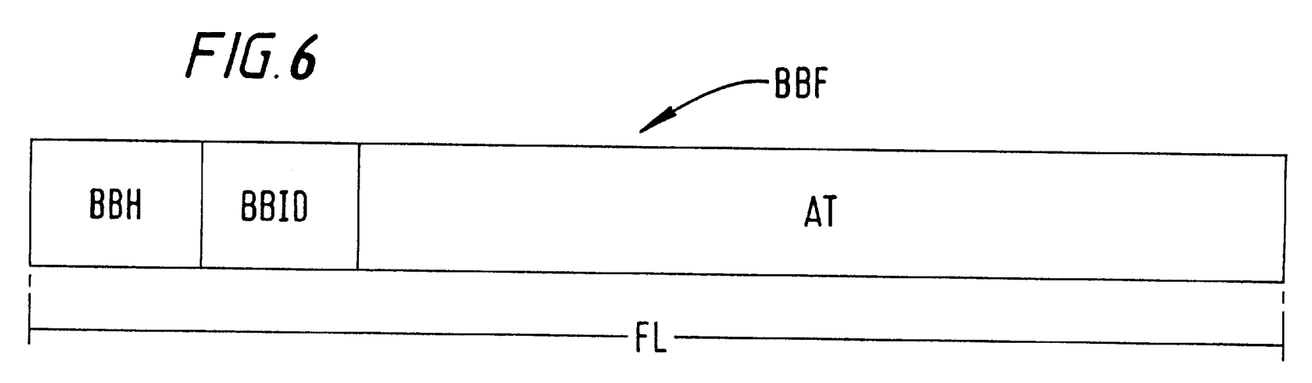
FIG. 6 shows the structure of a frame of the bulletin board channel.

As shown in FIG. 6, each bulletin board frame BBF comprises a frame header BBH, a bulletin board identity BBID and an allocation table AT.

The frame header BBH comprises synchronisation information to assist terminals in acquiring the bulletin board channel. The bulletin board ID field BBID contains general information such as the identity of the earth station 8 transmitting the bulletin board channel, the date and time, and the version number of the bulletin board, which is changed every time a change occurs in the information transmitted in the allocation table AT.

The allocation table AT comprises a set of entries transmitted sequentially, each relating to one traffic channel. Each entry comprises the following information:

1. A service ID indicating a specific service using the relevant traffic channel. The service corresponds to one specific service provided by one of the service providers 4.
2. A satellite beam ID identifying the satellite beam over which the traffic channel is transmitted.
3. A pager subset number range, indicating the group of terminals 14 allocated to that traffic channel. Each terminal 14 is pre-programmed with the different subsets into which it falls.
4. A channel number, which indicates the frequency assigned to that traffic channel.

Unused entry fields are filled with idle codes, so that the transmission on the bulletin board channel is continuous.

Frame Timing

Since the message blocks MB of the traffic channel frames are not always completely filled, the traffic channels are transmitted as bursts of up to four minutes' duration every four minutes. Multiple traffic channels are transmitted by each satellite 12, so that the transmit power used by the satellite 12 to transmit the traffic channels varies as the sum of the instantaneous power required to transmit the bursts of each channel. If all the traffic channels were synchronised so that their frames commenced at the same moment, the total transmit power at the start of the frames would be the total power required to transmit all the channels in use. As the bursts on the different traffic channels ended, so the total transmit power would fall until the beginning of the next frame, when the power would rise to the maximum once again. This method would lead to a high peak transmit power requirement and large power fluctuations in the satellite.

Moreover, if the bulletin board frames were synchronised to begin at the same time as the traffic channel frames, there would be a considerable delay in some cases between a terminal 14 receiving the relevant entry in the bulletin board channel and the start of the next frame of the traffic channel indicated by that entry. In the extreme case, where the entry is the first entry of the allocation table AT, the delay would be nearly four minutes.

Figure 7:
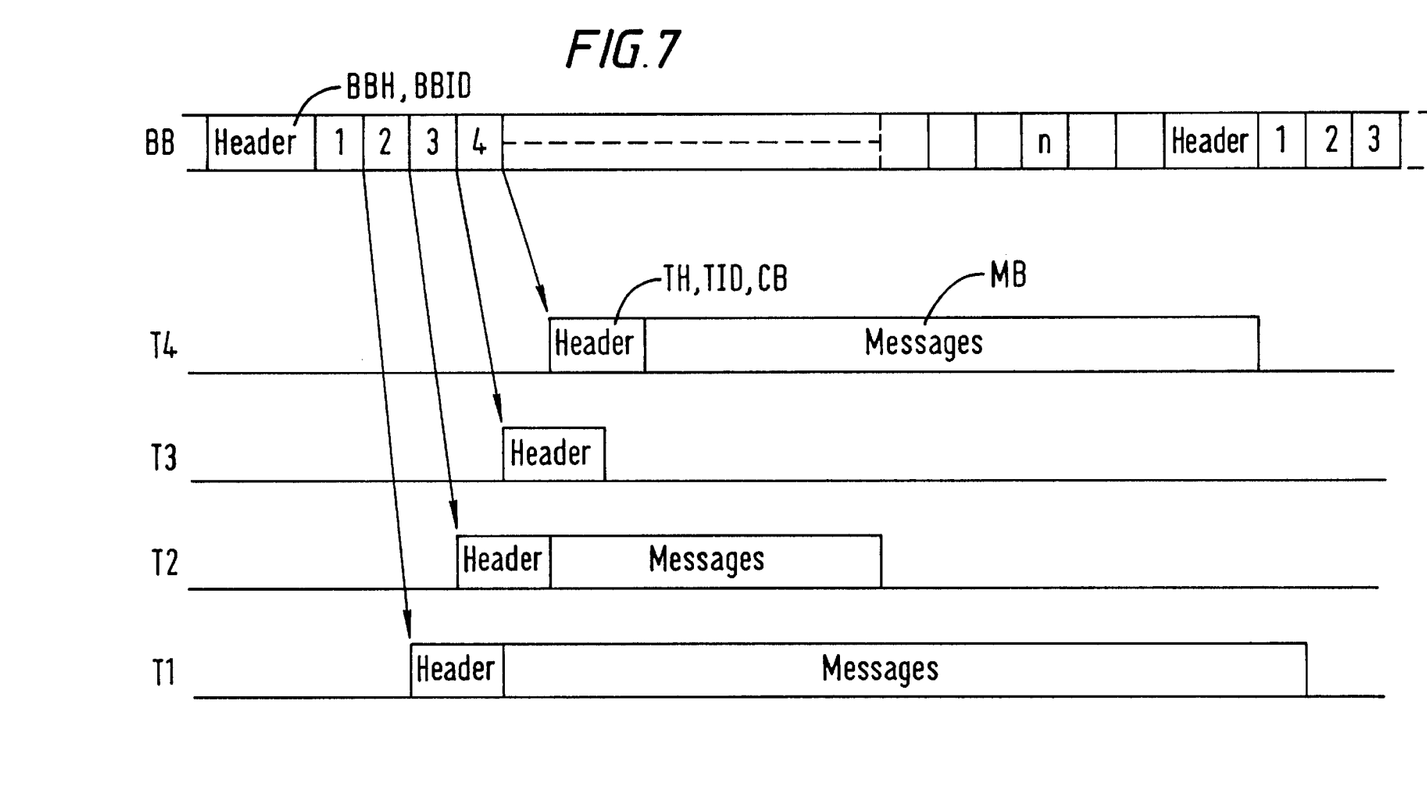
FIG. 7 shows the time alignment between the bulletin board channel and the traffic channels.

In order to avoid the above problems, the time alignment between the bulletin board frames and the traffic channel frames is as shown in FIG. 7. At the top row of the figure, the bulletin board header and identity BBH, BBID is shown followed by each of the entries in the allocation table AT. The first four entries AT1 to AT4 correspond to traffic channels T1 to T4, shown in successive rows below.

The start of each traffic channel frame header TH is delayed relative to the start of the bulletin board frame header BBH by a different multiple of 32 symbols, corresponding to eight seconds. For example, the start of the first traffic channel header TH1 is delayed by 8 seconds, the second channel header TH2 by 16 seconds, the third TH3 by 24 seconds and the fourth by 32 seconds, and so until the last traffic channel n delayed by n×8 seconds.

The timing of the traffic and bulletin board channels is referenced to the satellite 12, so that each earth station 8 transmits its traffic channels with a timing determined according to the propagation delay to the satellite 12 and the transmission of the traffic channels from the satellite is timed as described above, regardless of which earth station 8 transmitted that channel.

The delay between the start of the bulletin board frame and the start of each traffic frame may be a multiple of the order of the entry in the allocation table AT for that traffic frame, although the order of entries in the allocation table AT need not be exactly the same as the order of starting of the corresponding traffic frames. The order of entries is arranged so that there is a minimum delay between the end of transmission of an entry and the start of the corresponding traffic frame, which is sufficient to allow the terminal to retune from the bulletin board to the correct traffic channel, but the maximum delay is never more than a small fraction of the frame period.

In other embodiments, the delay may be chosen according to the number of traffic channels and the frame period, so as to reduce the peak transmit power of the satellite and/or keep the delay between a channel entry in the bulletin board channel and the start of the corresponding traffic channel frame between a minimum and a maximum value for any channel.

Frequency Allocation

When the terminal 14 is switched on, it automatically tunes to the fixed frequency of the bulletin board channel and receives the allocation table AT entries until an entry corresponding to a pager subset number of the terminal 14 and a service ID indicating a service subscribed to by the user 18 is received. The terminal then retunes to the traffic channel indicated by that entry. The bulletin board information may change while the terminal is tuned to the previously indicated traffic channel. It is therefore necessary to alert the terminal to chances in channel allocation which may affect it.

The terminal is alerted in the following manner. The changeover countdown field in the identity block TID of the traffic channel frame is normally set to zero, but a predetermined number of frames before a change in frequency allocation which affects the terminals tuned to that traffic channel, the changeover countdown field is set to that predetermined number and is decremented in each subsequent frame until the terminals must retune to the new channel. Meanwhile the new channel is signalled on the bulletin board channel.

Three different situations in which this method is employed will now be described.

Additional Traffic Channel

Figure 8:
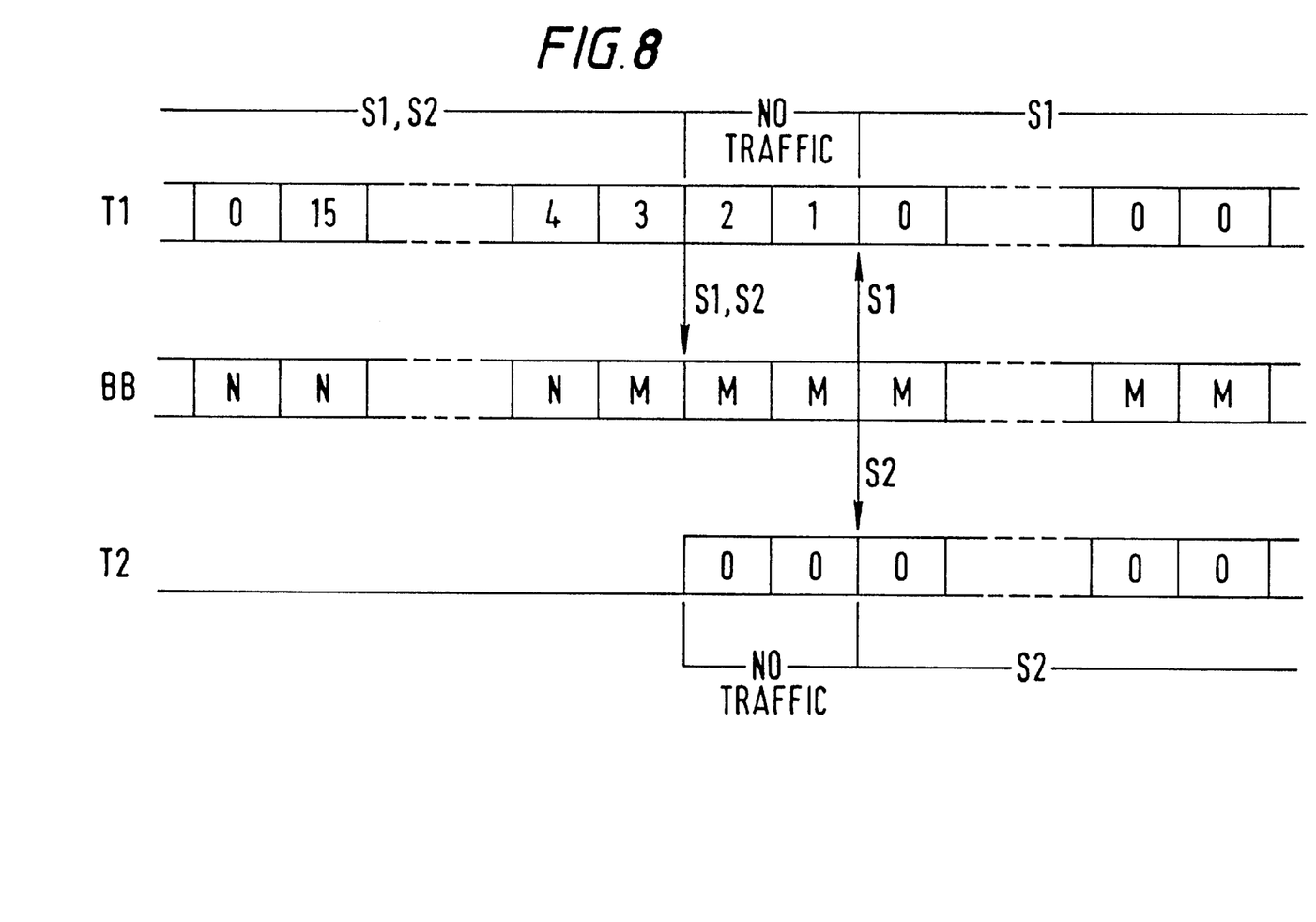
FIG. 8 is a diagram showing the addition of a new traffic channel.

In the example shown in FIG. 8, two subsets of terminals S1 and S2 are tuned to traffic channel T1. Within the frame divisions of T1 are shown the value of the changeover countdown field for that frame, while the version number of the bulletin board is shown within the frame boundaries of the bulletin board channel. At the third frame before the allocation changeover, the version of the bulletin board changes from N to M. After the third last frame of the traffic channel T1, all the terminals of subsets S1 and S2 retune to the bulletin board channel BB as indicated by the arrow in FIG. 8 and receive the new allocation entries for their subsets. In this example, subset S1 is to remain on traffic channel T1 while subset S2 is to change to traffic channel T2. The changeover countdown field of traffic channel T2, as shown between frame boundaries, remains at zero.

Meanwhile, in the last two frames before the channel changeover, no messages are sent in the traffic channel T1 as the terminals should now be tuned to the bulletin board channel BB. Transmission also begins in the new traffic channel T2 but no messages are sent until the point of changeover. At the point of changeover, as indicated by the arrows in FIG. 8, the subset S1 of pagers retune to traffic channel T1 while the subset S2 tune to the new traffic channel T2, and transmission of messages in the traffic channel T2 for the subset S2 begins.

Since the frame boundaries of the traffic channels and the bulletin board channel are not time aligned but are delayed as described above, a two frame period is allowed between the time when the terminals should tune to the bulletin board and the time when the terminals tune to the new channel, to ensure that none of the terminals fail to receive the necessary information.

The precise time at which the terminals 14 tune to the new channel T2 is aligned with the start of the bulletin board frame BBF. The internal clock 44 is synchronized with the start of the bulletin board frame and set according to the date and time information when the terminal is tuned to the bulletin board channel.

However, this method may also be applied to systems in which frame boundaries are aligned between different channels.

Removal of Traffic Channel

Figure 9:
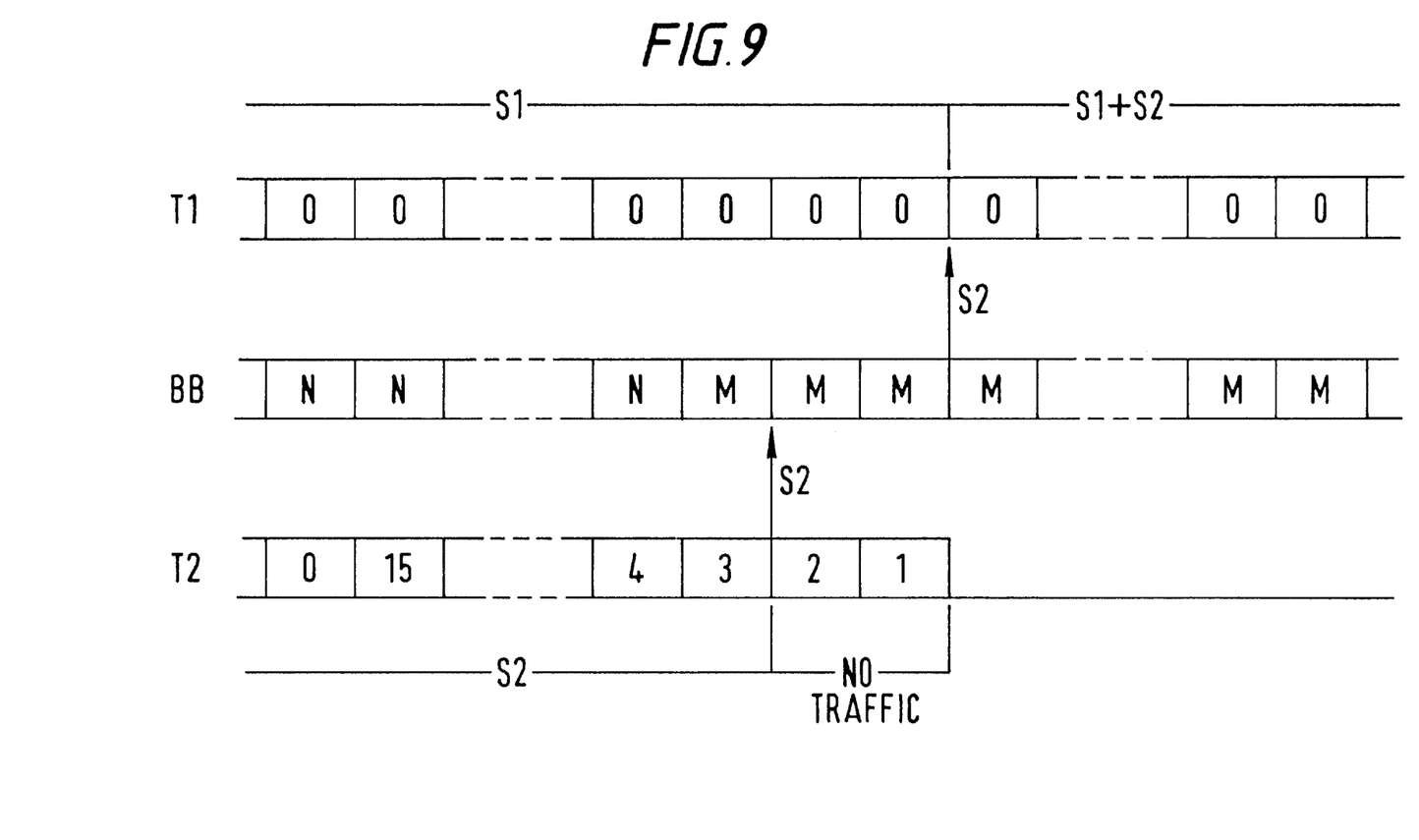
FIG. 9 is a diagram showing the removal of a traffic channel.

FIG. 9 shows another example in which a traffic channel is removed and terminals tuned to that channel are assigned to another existing channel. Initially, subset S1 are tuned to traffic channel T1 while subset S2 are tuned to traffic channel T2. Fifteen frames before the point of changeover, the changeover countdown field of traffic channel T2 is set to 15 and is decremented at each subsequent frame. After the value of the changeover countdown field is reduced to 3, the subset S2 retune to the bulletin board channel. At the third from last frame before the changeover, the bulletin board version changes from N to M and the new allocation of the subset S2 is indicated in the allocation table AT.

The subset S2 detect the new channel allocation and retune to the traffic channel T1 at the time of changeover. Subsequently, traffic channel T1 carries messages for both subset S1 and S2. Traffic channel T2 carries no messages for the last two frames before the allocation change, and no transmissions take place after the change.

In this example, the changeover countdown field value for traffic channel T1 is set to zero throughout the allocation change, because the change does not require the subset S1 to retune.

Change of Traffic Channel Frequency Allocation

Figure 10:
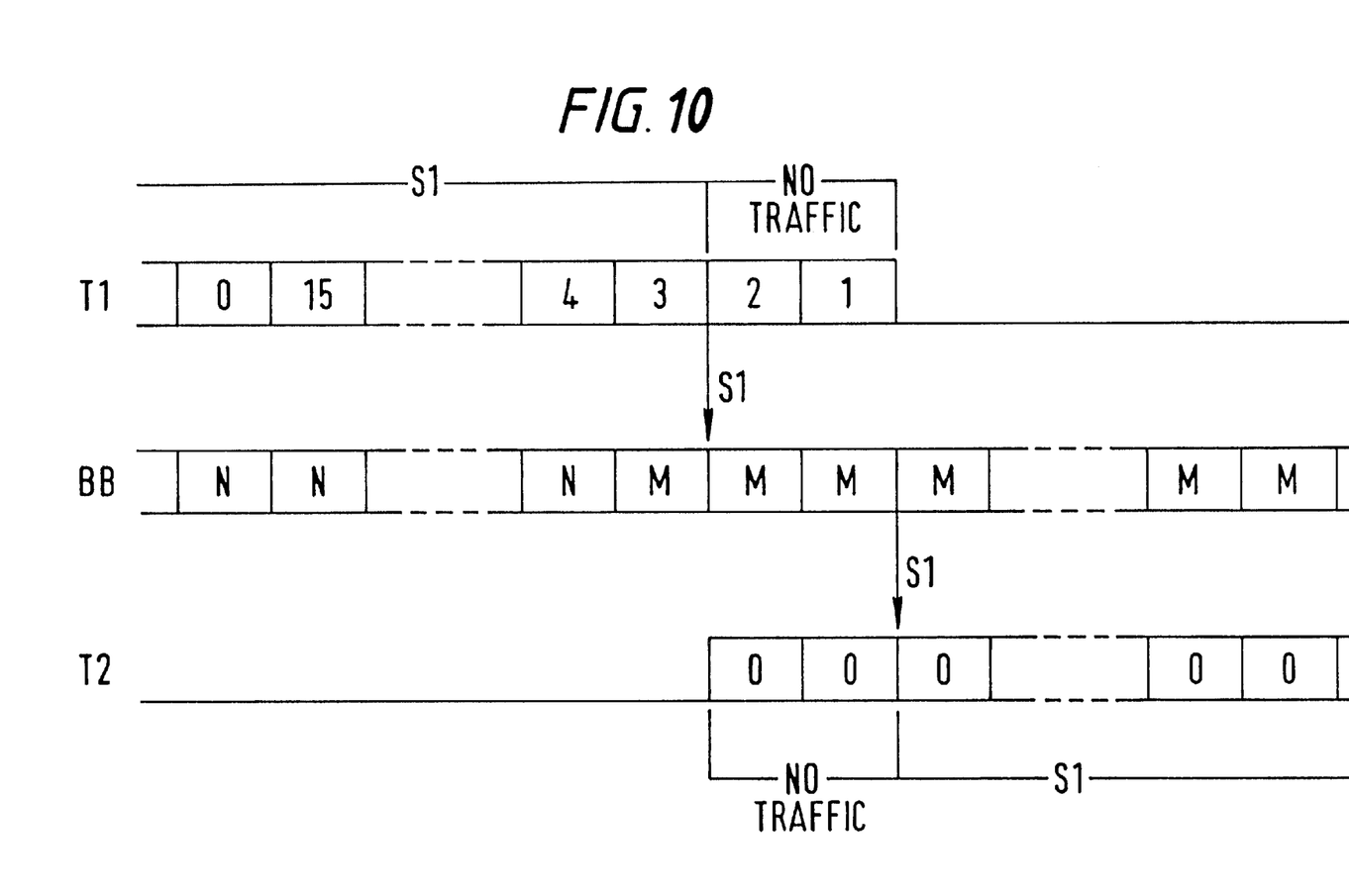
FIG. 10 is a diagram showing reallocation of a traffic channel frequency.

FIG. 10 shows an example in which all the terminals tuned to one traffic channel are retuned to another traffic channel.

Initially, subset S1 are tuned to traffic channel T1. As in the other examples, the changeover countdown field indicates that the channel allocation for these terminals is about to change. Before the change, the bulletin board version is changed and indicates the new traffic channel T2 assigned to all the subset S1. Two frames before the changeover, the terminals 14 of the subset S1 retune to the bulletin board channel BB and receive the new allocation entry from the allocation table AT. At the same time, transmission begins in the new traffic channel T2 but no messages are transmitted until the change. After the change, transmission ceases on the traffic channel T1.

The above methods provide a very robust method of controlling reallocation of terminals to traffic channels, since any terminal need only receive one changeover countdown field out of the 15 non-zero countdown fields and may still determine that a channel reallocation is required and when the reallocation should take place. If, however, a terminal is unable to receive 15 consecutive frames, it then automatically retunes to the bulletin board channel in order to determine whether any channel reallocation has taken place for the relevant subset.

Although the above embodiments have been described with reference to a satellite messaging system, aspects of the present invention are also applicable to terrestrial paging systems, particularly power limited systems or systems in which blockage of traffic channels may occur, and to paging systems with enhancements such as acknowledgement of messages by receivers. Aspects of the present invention may also be applied to combined satellite and terrestrial paging systems in which messages are relayed via satellite to terrestrial stations which retransmit the messages to paging receivers.

Aspects of the present invention are applicable to satellite communications systems using satellites other than geostationary satellites, in which case the allocation of earth stations to satellites will change as the satellites come into or go out of view of different earth stations.

It will be appreciated that individual elements of a messaging or paging system may be located in different jurisdictions or in space. The present invention extends to any such element which contributes to the aspects of the invention as herein defined.

What is claimed is:

1. A method of controlling a channel allocation of a receiver, comprising:
    controlling a transmission of a control channel indicating a current channel allocation of the receiver; whereby the current channel allocation is modified from a first traffic channel to a second traffic channel;
    controlling a transmission of the first traffic channel allocated to the receiver such that a channel change indication is transmitted over the first traffic channel to the receiver and the receiver is caused to receive said control channel so as to receive an indication of said modified allocation to the second traffic channel.

2. A method as claimed in claim 1, wherein the channel change indication is transmitted more than once before the receiver is required to receive said control channel.

3. A method as claimed in claim 2, wherein each of said channel change indications indicates when the current channel allocation of the receiver will be modified.

4. A method as claimed in any one claims 1 to 3, wherein said first traffic channel has a repeating frame structure, the channel change indications each being transmitted in a respective frame and indicating the number of frames remaining before the current channel allocation will be modified.

5. A method as claimed in any one of claims 1 to 3, whereby the receiver is caused to receive said second traffic channel after receiving said control channel with a timing determined by said channel change indication.

6. Apparatus for controlling a channel allocation of a receiver, comprising:
    means for controlling a transmission of a control channel indicating a current channel allocation of the receiver, whereby the current channel allocation is modified from a first traffic channel to a second traffic channel; and
    means for controlling a transmission of the first traffic channel allocated to the receiver such that a channel change indication is transmitted over the first traffic channel to the receiver and the receiver is caused to receive said control channel so as to receive said indication of said modified allocation to the second traffic channel.

7. Apparatus as claimed in claim 6, wherein the means for controlling the transmission of the first traffic channel is arranged so that the channel change indication is transmitted more than once before the receiver is required to receive said control channel.

8. Apparatus as claimed in claim 7, wherein the means for controlling the transmission of the first traffic channel is arranged so that each of said channel change indications indicates when the channel allocation of the receiver will be modified.

9. Apparatus as claimed in claim 6 or 7, wherein said means for controlling the transmission of the first traffic channel is arranged so that the first traffic channel has a repeating flame structure, the channel change indications being each transmitted in a respective frame and indicating a number of frames remaining before the current channel allocation will be modified.

10. A method of changing channel reception in a receiver, comprising:
    receiving a first traffic channel;
    detecting in said first traffic channel a channel change indication;
    receiving a control channel in response to said channel change indication;
    detecting a channel indication relating to the receiver in said control channel; and
    receiving a second traffic channel designated by said channel indication.

11. A method as claimed in claim 10, wherein the receiver begins to receive said second traffic channel at a time indicated by said channel change indication.

12. A method as claimed in claim 10 or 11, wherein the receiver begins to receive the control channel at a time indicated by said channel change indication, before receiving the second traffic channel.

13. A method as claimed in any one of claims 10 to 11, wherein the control channel includes a plurality of channel indications and a plurality of receiver indications, and the receiver receives the second traffic channel indicated by one of the channel indications corresponding to one of the receiver indications which corresponds to said receiver.

14. A receiver, comprising:
    means for controlling the receiver to receive a first traffic channel;
    means for detecting in said first traffic channel a channel change indication;
    means for controlling the receiver to receive a control channel in response to said channel change indication;
    means for detecting a channel indication relating to the receiver in said control channel; and
    means for controlling the receiver to receive a second traffic channel designated by said channel indication.

15. A receiver as claimed in claim 14, wherein the means for controlling the receiver to receive the second traffic channel is arranged so that the receiver begins to receive said traffic channel at a time indicated by said channel change indication.

16. A receiver as claimed in claim 14 or 15, wherein the means for controlling the receiver to receive the control channel is arranged so that the receiver begins to receive the control channel at a time indicated by said channel change indication, before receiving the second traffic channel.

17. A receiver as claimed in any one of claims 14 to 15, wherein the control channel includes a plurality of channel indications and a plurality of receiver indications, and the means for controlling the receiver to receive the second traffic channel is arranged so that the receiver receives the second traffic channel indicated by one of the channel indications corresponding to one of the receiver indications corresponding to said receiver.

18. A receiver as claimed in any one of claims 14 to 15, arranged to receive only one channel at any one time.

19. A receiver as claimed in any one of claims 14 to 15, wherein the receiver is included in a message terminal.

20. An apparatus for controlling a transmission of a plurality of frequency channels, each of which has a frame format of substantially a same constant frame period, comprising:
- a traffic channel controller to control a timing of transmission of said frequency channels such that a start timing of a plurality of frames of each of said frequency channels differs from that of other ones of said frequency channels; and
- a control channel controller to control a transmission of a control channel including a plurality of sets of channel control data each relating to a corresponding one of said plurality of frequency channels such that said sets are transmitted sequentially and an order of starting of said frames of said frequency channels substantially corresponds to an order of transmission of said sets of said channel control data.

21. An apparatus for controlling a channel allocation of a receiver, comprising:
- a control channel controller to control a transmission of a control channel indicating a current channel allocation of the receiver, whereby the current channel allocation is modified from a first traffic channel to a second traffic channel; and
- a traffic channel controller to control a transmission of the first traffic channel allocated to the receiver such that a channel change indication is transmitted to the receiver and the receiver is caused to receive said control channel so as to receive said indication of said modified allocation to the second traffic channel.

22. The apparatus as claimed in claim 21, wherein the traffic channel controller is arranged so that the channel change indication is transmitted more than once before the receiver is required to receive said control channel.

23. The apparatus as claimed in claim 22, wherein the traffic channel controller is arranged so that each of said channel change indications indicates when the channel allocation of the receiver will be modified.

24. The apparatus as claimed in claim 22 or 23, wherein said traffic channel controller is arranged so that the first traffic channel has a repeating frame structure, the channel change indications being each transmitted in a respective frame and indicating a number of frames remaining before the current channel allocation will be modified.

25. A receiver, comprising:
- a controller to control the receiver to receive a first traffic channel;
- a detector to detect in said first traffic channel a channel change indication, wherein:
  - said controller is further for controlling the receiver to receive a control channel in response to said detected channel change indication;
  - said detector is further for detecting a channel indication relating to the receiver in said control channel; and
  - said controller is further for controlling the receiver to receive a second traffic channel designated by said channel indication.

26. The receiver of claim 25, wherein said controller is arranged to cause said receiver to begin to receive said second traffic channel at a time indicated by said channel change indication.

27. The receiver as claimed in claim 25 or 26, wherein the controller is arranged to control the receiver to receive the control channel so that the receiver begins to receive the control channel at a time indicated by said channel change indication, before receiving the second traffic channel.

28. The receiver as claimed in any one of claims 25 to 26, wherein the control channel includes a plurality of channel indications and a plurality of receiver indications, and the controller is arranged to control the receiver to receive the second traffic channel so that the receiver receives the second traffic channel indicated by one of the indications corresponding to one of the receiver indications corresponding to said receiver.

29. The receiver as claimed in any one of claims 25 to 26, arranged to receive only one channel at any one time.

30. The receiver as claimed in any one of claims 25 to 26, wherein the receiver is included in a message terminal.

\* \* \* \* \*

UNITED STATES PATENT AND TRADEMARK OFFICE
CERTIFICATE OF CORRECTION

PATENT NO.      : 6,600,757 B1                                          Page 1 of 1
DATED           : July 29, 2003
INVENTOR(S)     : Edward Arthur Jones et al.

It is certified that error appears in the above-identified patent and that said Letters Patent is hereby corrected as shown below:

Column 10,
Line 6, "6" has been replaced with -- 7 --;
Line 6, "7" has been replaced with -- 8 --;
Line 9, "flame" has been replaced with -- frame --;

Column 12,
Line 35, -- channel -- has been inserted before "indications".

Signed and Sealed this

Twenty-seventh Day of January, 2004

JON W. DUDAS
*Acting Director of the United States Patent and Trademark Office*